United States Patent
Jahnke

(10) Patent No.: US 6,635,094 B1
(45) Date of Patent: Oct. 21, 2003

(54) SOOT FILTER CAKE DISPOSAL

(75) Inventor: Frederick C. Jahnke, Rye, NY (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/786,774

(22) PCT Filed: Nov. 12, 1999

(86) PCT No.: PCT/US99/26906
§ 371 (c)(1),
(2), (4) Date: Mar. 9, 2001

(87) PCT Pub. No.: WO00/29323
PCT Pub. Date: May 25, 2000

Related U.S. Application Data
(60) Provisional application No. 60/108,616, filed on Nov. 16, 1998.

(51) Int. Cl.[7] ............................. C01J 8/00; B01D 53/00
(52) U.S. Cl. ................... 48/200; 48/197 R; 48/214 R; 48/198.3; 95/149; 95/187; 95/273
(58) Field of Search ........................... 48/198.3, 197 R, 48/200, 214 R; 95/37, 149, 187, 273; 44/280–282, 550, 591

(56) References Cited

U.S. PATENT DOCUMENTS

| | | | |
|---|---|---|---|
| 3,232,728 A | * | 2/1966 | Reynolds ..................... 48/215 |
| 3,979,188 A | * | 9/1976 | McCallister ................. 48/215 |
| 4,021,366 A | * | 5/1977 | Robin et al. ................. 252/373 |
| 4,289,647 A | * | 9/1981 | Tippmer ...................... 252/373 |
| 4,338,101 A | * | 7/1982 | Tuttle ............................. 95/93 |
| 4,402,710 A | * | 9/1983 | Stellaccio ................. 48/197 R |
| 4,699,631 A | * | 10/1987 | Marion ..................... 48/197 R |
| 5,415,673 A | * | 5/1995 | Hilton et al. ............. 48/197 R |

FOREIGN PATENT DOCUMENTS

GB   1321069 A  *  8/1970  ............. C01B/2/14

* cited by examiner

Primary Examiner—Glenn Caldarola
Assistant Examiner—Alexa A. Doroshenk
(74) Attorney, Agent, or Firm—Josetta L. Jones; Morris N. Reinisch

(57) ABSTRACT

The present invention provides a method for the recovery of elemental carbon or soot produced during the partial oxidation reaction of a hydrocarbonaceous fuel and oxygen. An effluent stream of raw synthesis gas or syngas with entrained carbon soot is produced during the partial oxidation reaction. A filter cake (2) is fed to a receiving bin (10) and then to a lockhopper (14) where the wet filter cake is pressurized. Wet filter cake/oil feed mixture from lockhopper (14) is fed through line (38) to knockout vessel (44) wherein oil and water vapor exit (50) to a gasifier. An oil feed/particulate carbon mixture exits lockhopper (14) through lines (66) and (70) to oil feed storage drum (26), fed by oil feed (24), and exits water-free mixture of oil and solids (76) to a gasifier reaction zone.

9 Claims, 1 Drawing Sheet

SOOT FILTER CAKE DISPOSAL

This application is a 371 of PCT/US99/26906 filed Nov. 12, 1999 which claim benefit of No. 60/108,616 filed Nov. 16, 1998.

FIELD OF THE INVENTION

This invention is directed to improvements in the process of partial oxidation of hydrocarbonaceous feedstocks to produce synthesis gas or syngas mixtures comprising $H_2$, CO, and other gaseous materials. In particular, the improvements relate to the recovery of unreacted carbon and to temperature moderation of the gasification reactor used to produce the syngas, wherein a hydrocarbonaceous feed in admixture with a dispersion of recycled carbon-soot is introduced into a gasification system, particularly an oil-fed gasification system.

BACKGROUND OF THE INVENTION

The production of syngas from hydrocarbonaceous feedstocks requires the addition of oxygen to the syngas reactor, which is also known as a syngas generator, or gasifier. Such processes also require the addition of a moderator such as $CO_2$, steam or water to maintain the reactor temperature within permissible limits set by the economics of the operation and the limits of the reactor's refractory materials of construction.

A problem associated with the partial oxidation gasification process is the presence of unreacted or unconverted carbon, mostly in the form of soot, in the raw syngas product. Several techniques can be used to remove the soot, the most common being to scrub the syngas product with water in a scrubber where the entrained carbon is transferred to the scrubbing water and a scrubbed soot-free syngas is produced.

The soot-containing water can be further processed using petroleum naphtha to extract the carbon from the water phase. The soot can then be extracted from the petroleum naphtha with a heavy oil. The heavy oil will then contain substantially all the entrained carbon and can be used as a feedstock for the partial oxidation reactor, thereby utilizing the energy value of the carbon. Benzene can also be used as an alternative to naphtha as an extracting agent for the carbon. After separating the carbon from the water with the benzene, the benzene is stripped off and recovered for reuse.

Another technique used to remove the unreacted or unconverted carbon is to filter the scrubbing water and to recover the carbon filter cake for further processing.

U.S. Pat. No. 3,979,188 to McCallister discloses a method of concentrating the water-carbon slurry from the reactor gaseous effluent scrubbing step to about 5 to 7 percent carbon, mixing the concentrated slurry with a fuel oil and returning the carbon/oil/water mixture without vaporization to the partial oxidation reactor as a substitute for the commonly used superheated high pressure steam moderator.

U.S. Pat. No. 4,699,631 to Marion also discloses a method for concentrating an aqueous dispersion of soot to produce a pumpable soot-water dispersion of about 0.55 to 4.0 weight percent of carbon soot, and recycling the soot-water dispersion to the gas feed to the partial oxidation gasifier.

U. K Patent No 1,321,069 to Shell International Research discloses carbon soot removal by agglomerating the soot particles with a hydrocarbon oil as an auxiliary agent. The use of an auxiliary substance that renders the soot particles hydrophobic and oleophilic is also disclosed. Once formed, the agglomerated particles are physically removed using a sieve, are dried to remove residual water, and are finally recycled back to the gasifier as a reactant.

U.S. Pat. No. 4,289,647 to Tippmer discloses a method for recovering carbon from the effluent gas of a gasification reaction. The gas is quenched with water to separate the unburned carbon and ash, and the heat of the effluent gas is used to produce steam. The wash water is then decanted to separate it into clear water, carbon-containing water, and ash mud. The carbon-containing water is used to produce steam to control the conversion of the ash oil in the gasification reaction.

Partial oxidation gasifiers usually operate at high conversion rates to minimize soot formation. High soot formation is undesirable due to unstable soot suspensions and to increased bulk viscosity. Greater soot formation means a lower cold gas efficiency unless the heat value of the soot is recovered.

The amount of water that can be used to scrub the soot is limited to that needed to function as a moderator in the partial oxidation gasifier as determined by a heat balance. The amount of soot generated is set by the carbon:oxygen ratio. Thus the amount of water cannot be varied to prevent excessive soot buildup. It is an object of this invention to separate the water and soot streams to allow for a variation of the quantity of quench water used to scrub the soot. The soot can be concentrated by recycling the quench water to the quench ring of the quench zone.

Ideally, the gasifier could be run at lower syngas conversion rates while maintaining a low viscosity in the soot/water mixture.

In the partial oxidation gasification process, the raw process gas exits from the reaction zone of the gasifier at a temperature in the range of about 1700° F. to about 3500° F., typically from about 2000° F. to about 2800° F. and at a pressure of about 200 psia to about 2500 psia, typically from about 700 psia to about 1500 psia. Particulate carbon is present in the range of nil to about 20 weight percent based on the amount of carbon in the original feed.

U.S. Pat. No. 4,021,366, to Robin et al., discloses that it is desirable to maintain the concentration of particulate carbon in the quench water in the range of nil to about 20 2 weight percent, desirably below 1.5 weight percent.

The hot raw effluent syngas stream leaving the reaction zone of the partial oxidation gasifier carries with it substantially all the particulate carbon soot produced in the reaction zone of the gasifier. The hot raw effluent syngas stream is introduced into a quench zone or chamber located below the reaction zone of the gasifier. The turbulent condition of the quench zone, caused by large volumes of syngas bubbling through the quench water present therein, helps to scrub or remove most of the soot from the syngas. The quench chamber generates quantities of soot mixed with water.

In some gasification processes, moderator in the form of steam, water or other material such as carbon dioxide is required with oil feeds. When steam is used, less oxygen is generally required and a higher cold gas efficiency is possible.

When water is used as the moderator in the gasifier, soot and water formed during the partial oxidation gasification reaction can be recycled to the gasifier, thereby minimizing or eliminating the need for soot filter cake blowdown or for a carbon extraction unit.

This invention combines the benefits of steam and water moderators by recycling soot and water into the oil feed. The water is then removed by vaporizing it at high pressure.

The simple disposal of filter cake from the filtration of quench water poses many environmental difficulties. This invention provides a novel method for utilizing the soot filter cake by recycling it to the gasifier for use as a reactant.

SUMMARY OF THE INVENTION

The present invention provides a method for the recovery of elemental carbon or soot produced during the partial oxidation reaction of a hydrocarbonaceous fuel and oxygen. An effluent stream of raw synthesis gas or syngas with entrained carbon soot is produced during the partial oxidation reaction. The effluent stream is scrubbed with water to produce a stream of soot-free syngas and a stream of water contaminated with soot. The soot is removed-from the water, generally by filtration or other equivalent means to form a filter cake. Most or all of the filter cake is recycled to the gasifier to serve as a reactant.

DESCRIPTION OF THE PREFERRED EMBODIMENTS

Figure 1:
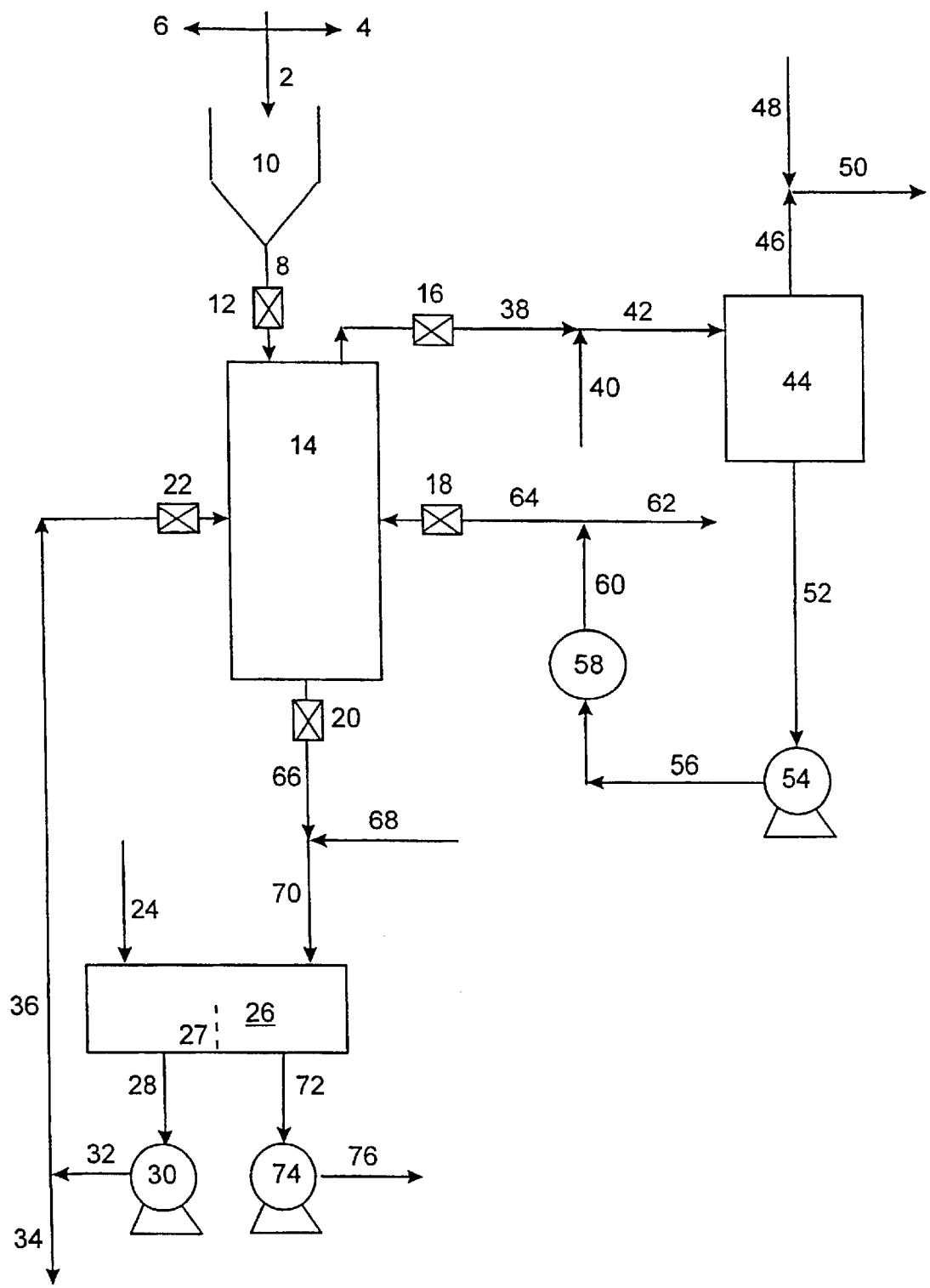
FIG. 1 is a schematic diagram of the process of the present invention.

In accordance with the present invention, the raw syngas effluent stream containing small amounts of entrained carbon soot and small amounts of entrained mineral ash is scrubbed with water. A clean syngas stream and a scrubbing water stream containing carbon soot and mineral ash are produced.

The scrubbing water stream is filtered to remove a major portion of the carbon soot in the form of a filter cake. The filter cake typically contains about 50 to 85% weight water, about 15 to 50% weight carbon soot, and about 2 to 20% weight mineral ash.

Most or all of the wet filter cake is contacted with a slipstream of oil feed to the gasifier at elevated pressure. Substantially all of the water from the filter cake is vaporized to form steam and is passed to the combustion zone of the gasifier, wherein it serves as a temperature moderator. The carbon soot and mineral ash become part of the oil slipstream to form an oil/soot/ash mixture which is then combined with the primary oil feed that is introduced into the reaction zone of the gasifier.

This invention enables the carbon soot to be completely burned in the gasifier and results in an increase in overall process efficiency. It also minimizes or eliminates the need for solid waste disposal of the filter cake, thereby eliminating or substantially reducing the associated environmental concerns and operating costs.

The operating system of the invention includes at least one lockhopper or equivalent apparatus, and can also comprise two or more lockhoppers operating in parallel, and a common knockout vessel, circulation pump, and heat exchanger.

Referring to FIG. 1, a wet carbon soot filter cake 2 usually obtained from the filtration of a syngas scrubbing water enters receiving bin 10 at ambient conditions.

The filter cake 2, can be divided into filter cake portions 4 and 6. Filter cake portion 4 can be diverted to solid waste disposal (not shown) to control the accumulation of mineral ash in the system. Filter cake portion 4 generally comprises up to about 20 weight % of the total filter cake being processed.

Filter cake portion 6 can be routed to the one or more lockhoppers that operate in parallel (not shown) with lockhopper 14.

Wet filter cake 8 exits receiving bin 10 and enters lockhopper 14 through open valve 12 under an inert atmosphere, preferably nitrogen. The entry to lockhopper 14 is surrounded by valves 16, 18, 20 and 22, which are in the closed position during the entry of wet filter cake 8 through valve 12.

When the wet filter cake occupies about 10% to about 50% of the total volume of lockhopper 14, valve 12 is closed and lockhopper 14 is pressurized to about 100 psi to about 300 psi above the operating pressure of the partial oxidation gasifier.

Valves 22 and 16 are then opened and oil feed stream 36 enters lockhopper 14 through valve 22 to form a wet filter cake/oil feed mixture therein. As the level of the oil rises in lockhopper 14, nitrogen is displaced through valve 16 and through line 38 which contains a pressure control valve (not shown), and passes through line 42 and enters knockout vessel 44.

Lockhopper 14 eventually becomes filled completely with the wet filter cake/oil feed mixture which then exits through valve 16 and similarly flows through lines 38 and 42 and into the knockout vessel 44.

The pressure downstream of the control valve in line 38 is is adjusted to vaporize a portion of the water so that it will remain in the vapor phase until it enters the reaction zone of the gasifier for use as a temperature moderator. Depending on the gasifier requirements, all or a portion of the water vapor plus any accompanying oil vapors can be passed to the gasifier.

The oil and water vapor mixture exits knockout vessel 44 through lines 46 and 50, and enters the reaction zone of the gasifier (not shown). The oil vapor is consumed in the partial oxidation reaction, and the water vapor helps to moderate the reaction temperature.

The more concentrated wet filter cake/oil feed mixture accumulates in knockout vessel 44 until operating level is reached, which occurs when knockout vessel 44 is about 30% to about 50% full, by volume.

Once the designated operating level is established in knockout vessel 44, lockhopper valve 18 is opened. The more concentrated wet filter cake/oil feed mixture passes through line 52, pump 54, and line 56 into heat exchanger 58, where heat is supplied to the more concentrated wet filter cake/oil feed mixture exiting as stream 60, which can then be divided into streams 62 and 64. Stream 64 flows through valve 18 into lockhopper 14. Stream 62 enters another parallel lockhopper (not shown).

Inside lockhopper 14 the more concentrated wet filter cake/oil feed 60 is mixed with the oil feed stream 36 entering through valve 22. The carbon soot/oil/water mixture is exposed to a second elevated pressure, lower than the first elevated pressure. The combined mixture of oil feed and the more concentrated wet filter cake/oil feed exits the top of lockhopper 14, through valve 16, and the pressure control valve (not shown) in line 38. Flashing occurs across the pressure control valve to produce a vapor stream of water with small amounts of oil and a drier filter cake/oil feed mixture which enter knockout vessel 44 and are separated in lines 46 and 52 as previously described.

The circulation of the drier filter cake/oil feed stream 52 from knockout vessel 44 to lockhopper 14 is continued until little additional water vapor is generated in line 46 and a substantially dry filter cake/oil feed is produced. For example, the water content is typically less than about 0.5 weight %.

The circulating pump 54 and the heat exchanger 58 are then deactivated. Lockhopper valves 16, 18, and 22 are closed, and lockhopper valve 20 is opened. The substantially dry mixture of oil feed and filter cake, which is more accurately an oil feed/particulate carbon mixture, exits lockhopper 14 through lines 66 and 70 and into the oil feed storage drum 26.

Oil feed 24 enters one side of the oil feed storage drum 26. The pressure of the oil feed varies from about 300 psig to about 2600 psig, preferably from about 600 psig to about 1600 psig, The temperature of the oil feed varies from about 400° F. to about 700° F., preferably from about 450° F. to about 650° F.

The majority of oil feed 24 flows over an internal baffle 27 to the other side of drum 26. The portion of oil remaining in the left entry side of drum 26 flows through line 28, pump 30, and line 32 and is then divided into lines 34 and 36. Line 36 provides the oil feed stream to lockhopper 14, and line 34 provides the oil feed to the additional lockhoppers (not shown). A level control valve (not shown) in line 36 regulates the supply of the oil feed stream to lockhopper 14.

The water-free mixture of oil feed and entrained solids entering the right side of drum 26 through line 70 exits through line 72, passes through pump 74, and line 76 and then enters the reaction zone of the gasifier (not shown).

Streams 40, 48, 62 and 68 are all associated with additional lockhoppers, preferably operating in parallel. Stream 40 is analogous to stream 38 and serves as a conduit for high pressure nitrogen and a wet filter cake/oil feed mixture exiting a parallel lockhopper (not shown) in the system. Stream 48 is analogous to stream 46 and serves as an oil and water vapor exit line for a parallel knockout pot (not shown) in the system. Stream 62 is analogous to stream 64 and serves as the conduit for an unflashed wet filter cake/oil feed stream entering a parallel lockhopper (not shown) in the system. Stream 68 is analogous to stream 66 and serves as the conduit for an essentially water-free mixture of oil feed and entrained solids exiting a parallel lockhopper (not shown) in the system.

As already noted, the lockhoppers are pressurized with nitrogen after the wet filter cake is loaded and before the hot oil feed stream is introduced. This is done to prevent significant vaporization of the water and thus significant cooling of the oil. Significant cooling of the oil could cause plugging problems since the viscosity of the oil increases as the temperature decreases.

For a given oil feed composition, the size of filter cake blowdown stream 4 relative to the size of total filter cake stream 2 determines the equilibrium concentration of mineral ash in the system. A large blowdown stream 4 favors low metals concentrations, while a small blowdown stream 4 favors high metals concentrations.

In the latter case, the metals content of the filter cake may be high enough to send the blowdown stream to a metals reclamation facility rather than to a solid waste disposal facility. If 100% of the filter cake were recycled to the lockhoppers, no metals blowdown would occur. Under such a scenario, controlled oxidation deslagging of the gasifier would be required on a periodic basis, for example, annually for vacuum residue feeds.

What is claimed is:

1. A method for the recovery and reuse of unreacted carbon soot produced by the partial oxidation reaction of a hydrocarbonaceous fuel and oxygen in a partial oxidation reactor to produce an effluent stream of synthesis gas and entrained carbon soot, comprising:

a) scrubbing the effluent stream with water to remove the entrained carbon therefrom, thereby producing a carbon soot-free synthesis gas and a stream of water and entrained carbon;

b) filtering the stream of water and entrained carbon to produce a wet filter cake of carbon soot;

c) contacting the wet filter cake with oil at a first elevated pressure to form a first mixture of carbon soot/oil/water;

d) exposing the carbon soot/oil/water mixture to a second elevated pressure, lower then the first elevated pressure, to vaporize and separate a portion of the water content from the first carbon soot/oil/water mixture to thereby form a more concentrated second carbon soot/oil/water mixture;

e) recycling the more concentrated second carbon soot/oil/water mixture to steps (c) and (d) wherein essentially all of the water is removed to form a substantially water-free carbon soot/oil mixture; and f) passing the substantially water-free carbon soot/oil mixture to a partial oxidation gasification reaction to serve as a reactant.

2. The method of claim 1, wherein all or a portion of the water vapor is used as a temperature moderator in the partial oxidation gasification reaction.

3. The method of claim 1, wherein the first pressure is about 100 psi to about 300 psi above the operating pressure of the partial oxidation gasification reaction.

4. The method of claim 1, wherein the second pressure is sufficient to maintain the water vapor in a vapor phase until it enters the reaction zone of the gasifier.

5. The method of claim 1, wherein step (c) is conducted in a lockhopper.

6. The method of claim 5, wherein the initial contact of the wet filter cake with the oil occurs when the wet filter cake occupies about 10% to about 50% of the total volume of the lockhopper.

7. The method of claim 1, wherein the separation of the water vapor in step (d) is conducted in a knockout vessel.

8. The method of claim 7, wherein the more concentrated carbon soot/oil/water mixture is recycled from the knockout vessel when said vessel is about 30% to about 50% full by volume.

9. The method of claim 1, wherein the substantially water-free carbon soot/oil mixture contains less than about 0.5 weight % water.

* * * * *